Patented Apr. 9, 1929.

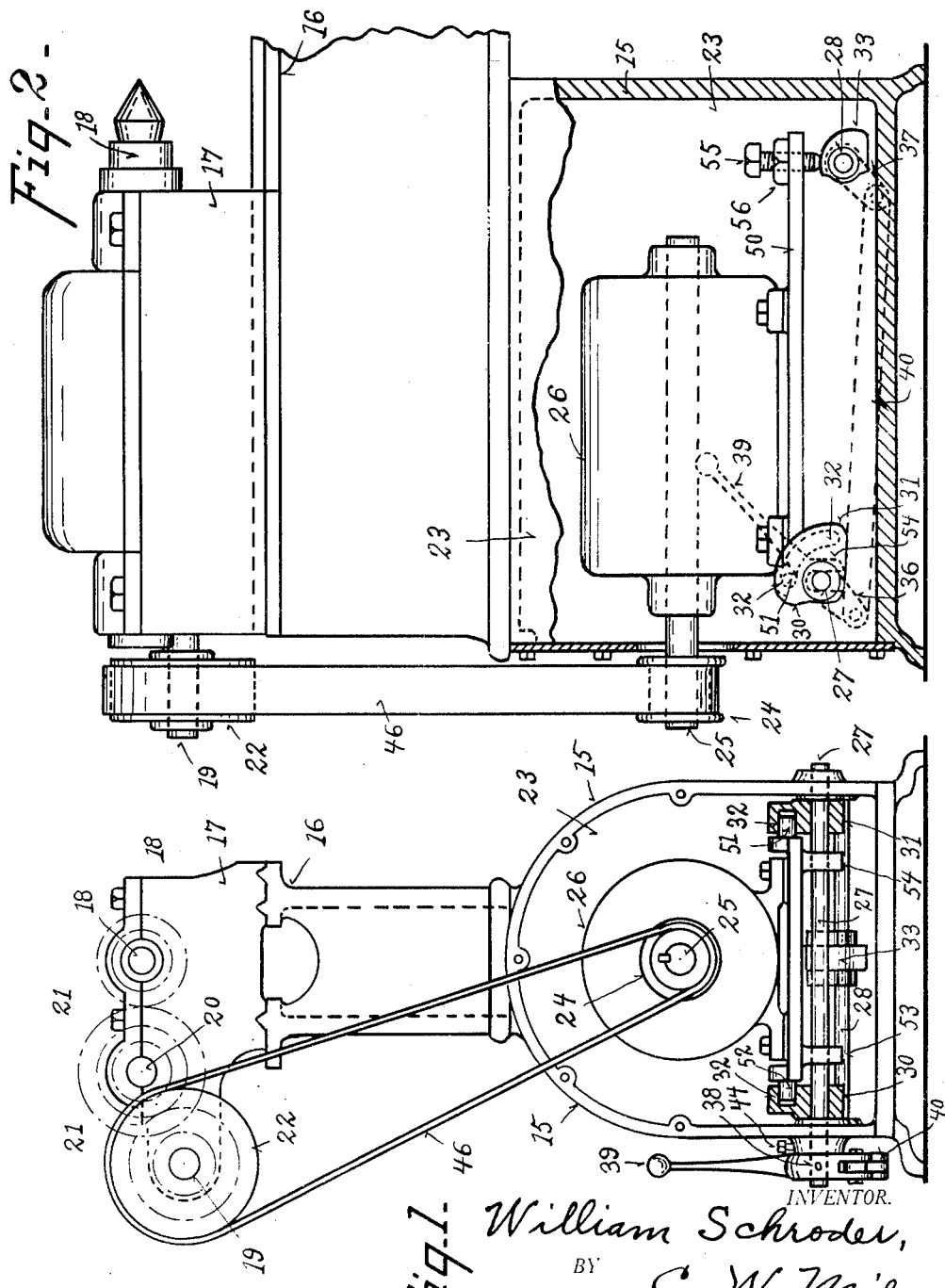

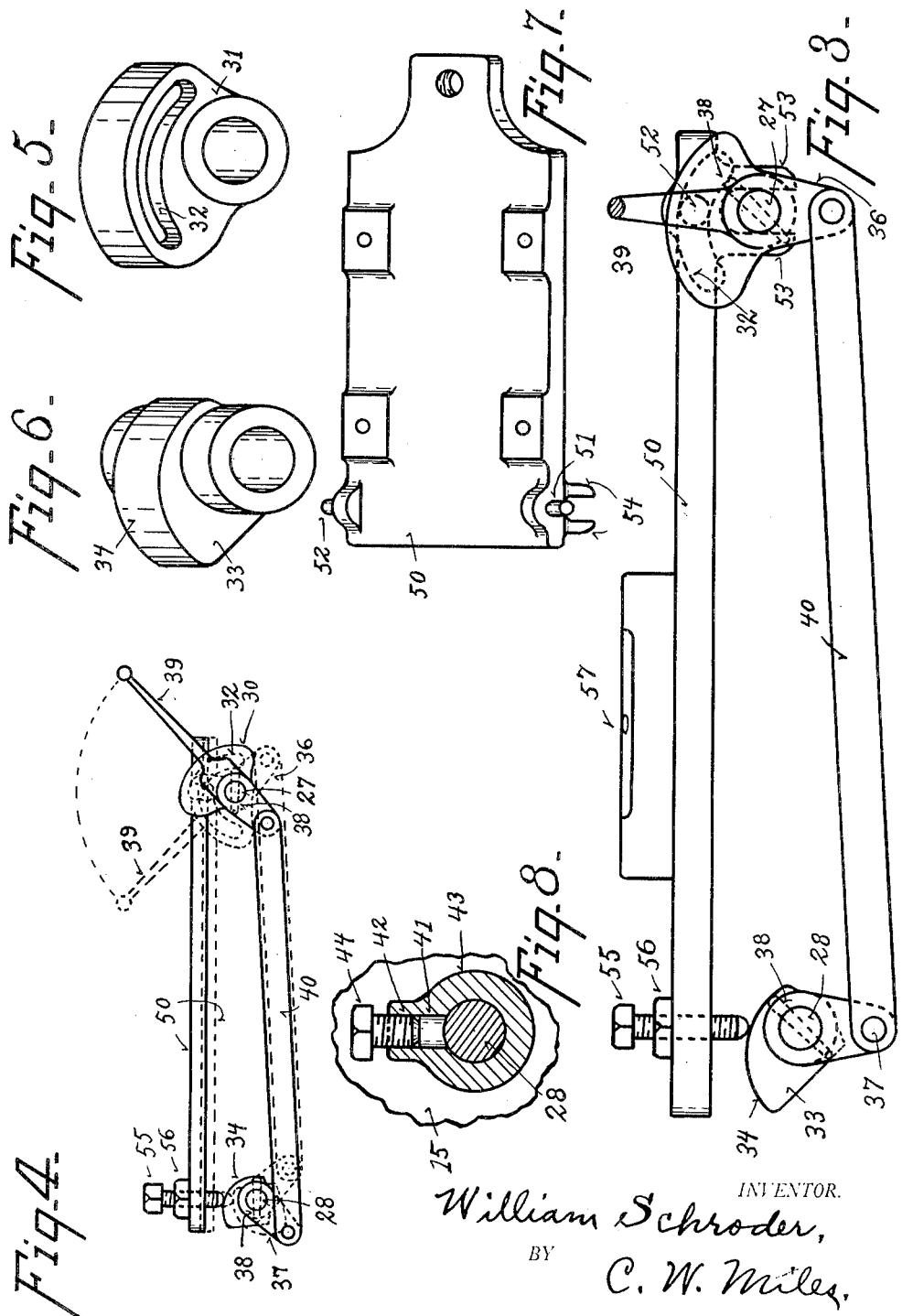

1,708,903

UNITED STATES PATENT OFFICE.

WILLIAM SCHRODER, OF COVINGTON, KENTUCKY, ASSIGNOR TO THE SEBASTIAN LATHE COMPANY, OF CINCINNATI, OHIO, A CORPORATION OF OHIO.

POWER-TRANSMITTING MECHANISM.

Application filed December 7, 1927. Serial No. 238,416.

My invention relates to improvements in driving apparatus. One of its objects is to provide improved apparatus by means of which an electrical motor or other driving member is adapted to be adjustably mounted relative to the base or frame of a tool to be driven thereby. Another object is to provide improved apparatus adapted to be adjusted as required to tighten a driving belt between the motor or driving member and a driven shaft on the tool. Another object is to provide improved means adapted to level or align the motor and driving shaft with the driven shaft. Another object is to provide improved means to align the motor shaft with the driven shaft and to provide for adjusting the motor and driving shaft without disturbing such alignment. My invention also comprises certain details of form and arrangement and combination of components, all of which will be fully set forth in the description of the accompanying drawings, in which;

Fig. 1 is an end view of a tool and driving motor embodying my improvements.

Fig. 2 is a side elevation of a portion of the tool and the motor shown in Fig. 1, the base of the tool being shown in central vertical section.

Fig. 3 is a diagrammatic view of the motor supporting table and its supporting and adjusting mechanism detached.

Fig. 4 is a diagrammatic view of the adjusting lever mechanism.

Fig. 5 is a perspective view of one of the adjusting cams detached.

Fig. 6 is a perspective view of another adjusting cam detached.

Fig. 7 is a perspective view of the motor supporting table, detached.

Fig. 8 is a detail of clamping means employed to clamp the motor supporting and adjusting apparatus to its adjusted positions.

The accompanying drawings illustrate one embodiment of my invention in which 15 represents the base or supporting frame of a tool, a lathe for instance, to be driven by an electrical or other motor. Lathe ways 16 are shown mounted upon the base 15, and a lathe headstock 17 is shown mounted upon one end of the ways 16. The headstock is provided with journal bearings in which a lathe spindle 18 is journaled. A driven shaft 19 and an intermediate shaft 20 are also journaled to the headstock and provided with any desired arrangement of change gears 21, whereby the lathe spindle may be driven from the shaft 19 at varying speed ratios. A belt pulley 22 is mounted upon the shaft 19 in alignment with a belt pulley 24 which is mounted upon the shaft 25 of an electrical motor 26.

In order to properly transmit power by belt or gears, from a motor shaft 25 for instance, to a driven shaft 19 for instance, it is important to have the motor shaft in alignment with the driven shaft, and also to be able to adjust one of said shafts to and from the other, particularly where a belt drive is employed.

In order to mount, align, and adjust the motor to advantage relative to the base and driven shaft, a housing chamber 23 is provided in the base member, and near the bottom of said chamber and in the front and rear walls of said chamber are provided journal bearings for two shafts 27 and 28.

Mounted rigidly upon the shaft 27 within the housing chamber are two counterpart or right hand and left hand cams 30 and 31 facing each other and each provided with an eccentrically arranged cam recess 32. The shaft 28 has rigidly mounted thereon a cam 33 having an eccentrically arranged peripheral cam face 34. The ends of the shafts 27 and 28 extend outside of the rear face of the housing chamber a sufficient distance to have forked crank arms 36 and 37 attached rigidly thereto by means of tapered pins 38 which insure correct assembly and prevent subsequent displacement. The crank arm 36 is also provided with an actuating lever 39 by means of which the shaft 27 may be rocked manually through a fraction of a revolution thereof. A link 40 is pivotally attached at one end to the free end of the crank arm 36, and at its opposite end is pivotally attached to the free end of the crank arm 37, thereby connecting the shafts 27 and 28 together so that they may be correspondingly rocked together through the actuation of the lever 39.

A clamping member 41 is mounted in a recess 42 in the boss or journal box 43 forming part of the base member 15 and is engaged by a clamping bolt 44 threaded into the perforation 42 to enable the shaft 28 to be clamped rigidly in its bearing 43 so as to prevent the shafts 27 and 28 from rotating after they have been adjusted to the desired position, until a further adjustment of said shafts 27 and 28 is required to further tighten or tension the belt. I have illustrated a flexible belt 46 as a preferable means to drive the shaft 19 from the motor shaft 25, but a train of gears or sprocket chain may be employed if desired.

A motor plate or table 50 is mounted at one end upon and above the shaft 27 by means of studs 51 and 52 which enter and travel along the cam recesses 32 as the shaft 27 is rocked. The table 50 is also retained in position above and relative to the shaft 27 by means of downwardly directed forked projections 53 and 54. The parallel vertical walls of the slot in said projections 53 and 54 are spaced apart a distance equal to the diameter of the shaft 27, and hence retain the table 50 in place against movement endwise or transversely of said table, but permit said table to move vertically relative to the shaft 27, due to the relative movement of the shaft 27 in a vertical direction in the slots of projections 53 and 54 and movement of studs 51 and 52 in the eccentric cam grooves 32 when the shaft 27 is rocked. At the opposite end the table 50 is provided with a set screw 55 tapped through the end of table 50 and with its lower end in position to ride upon the face 34 of the cam 33. A lock nut 56 serves to lock the set screw 55 to its adjusted position relative to the table 50. A level 57 is placed upon the top of the table 50 and the screw 55 adjusted until the top face of table 50 stands level or in alignment with the shaft 19, after which the nut 56 is tightened and the motor bolted to the top face of table 50. The tension of the belt always tends to hold the bolt 55 in contact with the face 34 of the cam, and hence level. When the shafts 27 and 28 are rocked in unison the table 50 moves vertically, and its top face retains a level horizontal position.

In order to install the motor relative to the base, no planing or other expensive or difficult machine work is required, all that is necessary is to bore and fit the journal boxes for the shafts 27 and 28. By securing the crank arms 36 and 37 and cams 30, 31 and 33 to the shafts 27 and 28, these parts once assembled are positively held to one relative position, and are not liable to become displaced. In order to place the belt 46 in position the table 50, motor 26 and motor shaft 25 are elevated by rocking the lever 39, Fig. 4, to its extreme right hand position. The belt is then placed upon the pulleys 22 and 24, and the lever 39 rocked toward its left hand position which serves to lower the motor table 50, motor 26 and shaft 25 until sufficient tension is placed upon the belt 46, after which the clamping bolt 43 is tightened to lock the shafts 27 and 28 rigidly to the base member 15 until further tightening of the belt is required. Other clamping means than that described may be employed to lock the shafts 27 and 28 to the base 15 if desired.

The apparatus herein shown and described is capable of considerable modification within the scope of the claims without departing from the spirit of my invention.

What I claim is:

1. A power transmitting mechanism comprising a driven spindle, a driving spindle, means to drive said driving spindle, a supporting member upon which said driving spindle is journaled, means to guide said supporting member to and from said driven spindle, reciprocating means to adjust one end of said supporting member toward or from said driven spindle, reciprocating means to adjust the opposite end of said supporting member toward or from said driven spindle, connecting means operatively connecting said respective reciprocating means to cause them to reciprocate in unison to simultaneously adjust opposite ends of said supporting member toward or from said driven spindle, and means to variably adjust one end of said supporting member relative to the opposite end thereof to align said driving spindle with said driven spindle.

2. A power transmitting mechanism comprising a driven spindle, a driving spindle, means to drive said driving spindle, a supporting member to which said driving spindle is journaled, means to guide said supporting member to and from said driven spindle, reciprocating means operable to adjust one end of said supporting member toward or from said driven spindle independently of the opposite end, reciprocating means operable to adjust the opposite end of said supporting member toward or from said driven spindle, and connecting means operable to reciprocate said respective reciprocating means in unison to simultaneously adjust both ends of said supporting member toward or from said driven spindle.

3. A power transmitting mechanism comprising a driven spindle, a driving spindle, means to drive said driving spindle, a supporting member to which said driving spindle is journaled, a first rock shaft journaled in fixed bearings and located at one end of said supporting member, forked projections carried by said supporting member engaging opposite sides of said first rock shaft to guide said supporting member in its movements toward and from said driven spindle, cams upon said first rock shaft to engage opposite sides of one end of said supporting member to adjust one end of said supporting member toward and from said driven spindle, a second rock shaft parallel to said first rock shaft and located near the opposite end of said supporting member, a cam carried by said second rock shaft to engage and adjust the opposite end of said supporting member toward and from said driven spindle, and connecting means connecting said second rock shaft to said first rock shaft to cause both ends of said supporting member to move simultaneously toward or from said driven spindle.

4. A power transmitting mechanism comprising a driven spindle, a driving spindle, means to drive said driving spindle, a supporting member to which said driving spindle is journaled, a first rock shaft journaled in fixed bearings and located at one end of said supporting member, forked projections carried by said supporting member engaging opposite sides of said first rock shaft to guide said supporting member in its movements toward and from said driven spindle, cams upon said first rock shaft to engage opposite sides of one end of said supporting member to adjust one end of said supporting member toward and from said driven spindle, a second rock shaft parallel to said first rock shaft and located near the opposite end of said supporting member, a cam carried by said second rock shaft to engage and adjust the opposite end of said supporting member toward and from said driven spindle, and connecting means connecting said second rock shaft to said first rock shaft to cause both ends of said supporting member to move simultaneously toward or from said driven spindle, and means to adjust said driving spindle relative to said rock shafts into alignment with said driven spindle.

5. A power transmitting mechanism comprising a driven spindle, a driving spindle, a motor to drive said driving spindle, a supporting member upon which said motor and driving spindle are mounted, a first rock shaft journaled in fixed bearings and located at one end of said supporting member, forked projections carried by said supporting member engaging opposite sides of said first rock shaft to guide said supporting member in its movements toward and from said driven spindle, cams upon said first rock shaft to engage opposite sides of one end of said supporting member to adjust one end of said supporting member toward and from said driven spindle, a second rock shaft parallel to said first rock shaft and located near the opposite end of said supporting member, a cam carried by said second rock shaft to engage and adjust the opposite end of said supporting member toward and from said driven spindle, connecting means operatively connecting said second rock shaft to said first rock shaft to cause both ends of said supporting member to move simultaneously toward or from said driven spindle.

6. A power transmitting mechanism comprising a driven spindle, a driving spindle, a motor to drive said driving spindle, a supporting member upon which said motor and driving spindle are mounted, a first rock shaft journaled in fixed bearings and located at one end of said supporting member, forked projections carried by said supporting member engaging opposite sides of said first rock shaft to guide said supporting member in its movements toward and from said driven spindle, cams upon said first rock shaft to engage opposite sides of one end of said supporting member to adjust one end of said supporting member toward and from said driven spindle, a second rock shaft parallel to said first rock shaft and located near the opposite end of said supporting member, a cam carried by said second rock shaft to engage and adjust the opposite end of said supporting member toward and from said driven spindle, connecting means operatively connecting said second rock shaft to said first rock shaft to cause both ends of said supporting member to move simultaneously toward or from said driven spindle, and means adjustable relative to said rock shafts to align said motor and driving spindle relative to said driven spindle.

7. A power transmitting mechanism comprising a driven spindle having a driven member, a driving spindle having a driving member, a driving spindle supporting member mounted by means of guides to move to and from said driven spindle, a first rock shaft journaled in fixed bearings transversely to said driving spindle and located near one end of said supporting member, a second rock shaft journaled in fixed bearings transversely to said driving spindle and located near the opposite end of said supporting member, a pair of cams mounted rigidly upon said first rock shaft and engaging opposite sides of one end of said supporting member to elevate and lower one end of said supporting member, a cam mounted rigidly upon said second rock shaft and adapted to engage and elevate and lower the opposite end of said supporting member, and connecting means from one of said rock shafts to the other rock shaft to cause said rock shafts to rock in unison.

8. A power transmitting mechanism comprising a driven spindle, a driving spindle, means to drive said driving spindle, a supporting member to which said driving spindle is journaled, means to guide said supporting member to and from said driven spindle, reciprocating means operable to adjust said supporting member toward or from said driven spindle, means to change the alignment of said driving spindle relative to said driven spindle, and means to lock said reciprocating means to different positions of adjustment.

9. A power transmitting mechanism comprising a driven spindle, a driving spindle, means to drive said driving spindle, a supporting member to which said driving spindle is journaled, a first rock shaft journaled in fixed bearings and located at one end of said supporting member, cams upon said first rock shaft to engage opposite sides of one end of said supporting member to adjust one end of said supporting member toward and from said driven spindle, a second rock shaft parallel to said first rock shaft and located near the opposite end of said supporting member, a cam carried by said second rock shaft to engage and adjust the opposite end of said supporting member toward and from said driven spindle, guide members to guide said supporting member relative to said rock shafts to and from said driven spindle, connecting means connecting said second rock shaft to said first rock shaft to cause said supporting member to move simultaneously at opposite ends toward or from said driven spindle, means to align said driving spindle relative to said rock shafts with said driven spindle, and means to lock said rock shafts to different positions of adjustment.

In testimony whereof I have affixed my signature.

WILLIAM SCHRODER.